US009753272B2

(12) United States Patent
Kwon et al.

(10) Patent No.: US 9,753,272 B2
(45) Date of Patent: Sep. 5, 2017

(54) METHOD AND APPARATUS FOR CONTROLLING ELECTROWETTING CELL

(71) Applicants: Samsung Electronics Co., Ltd., Suwon-si (KR); Seoul National University R&DB Foundation, Seoul (KR)

(72) Inventors: Yong-joo Kwon, Yongin-si (KR); Kyu-hwan Choi, Yongin-si (KR); Yun-hee Kim, Seoul (KR); Jung-mok Bae, Seoul (KR); Yoon-sun Choi, Yongin-si (KR); Jung-hoon Lee, Seoul (KR); Seung-yul Choi, Seoul (KR)

(73) Assignees: SAMSUNG ELECTRONICS CO., LTD., Suwon-si (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 475 days.

(21) Appl. No.: 14/469,142

(22) Filed: Aug. 26, 2014

(65) Prior Publication Data

US 2015/0116813 A1  Apr. 30, 2015

(30) Foreign Application Priority Data

Oct. 28, 2013 (KR) .................. 10-2013-0128647

(51) Int. Cl.
*G02B 26/00* (2006.01)
*G09G 3/00* (2006.01)
*G09G 3/34* (2006.01)

(52) U.S. Cl.
CPC .......... *G02B 26/005* (2013.01); *G09G 3/006* (2013.01); *G09G 3/348* (2013.01); *G09G 2330/12* (2013.01)

(58) Field of Classification Search
CPC .... G02B 26/005; G02B 26/02; G02B 26/004; G02B 26/001; G09G 3/348
See application file for complete search history.

(56) References Cited

U.S. PATENT DOCUMENTS

| 7,126,903 | B2 | 10/2006 | Feenstra et al. |
| 7,245,439 | B2 | 7/2007 | Kuiper et al. |
| 2008/0137213 | A1 | 6/2008 | Kuiper et al. |
| 2008/0284931 | A1* | 11/2008 | Kimura ............... G02F 1/13624 349/39 |
| 2009/0034055 | A1* | 2/2009 | Gibson ............. G02F 1/133516 359/296 |

(Continued)

OTHER PUBLICATIONS

Bart de Boer et al., "Control of an Electrowetting-Based Beam Deflector", Journal of Applied Physics, 107, pp. 063101-1-063101-5; 2010.

(Continued)

*Primary Examiner* — Bumsuk Won
*Assistant Examiner* — Tamara Y Washington
(74) *Attorney, Agent, or Firm* — Sughrue Mion, PLLC

(57) ABSTRACT

Provided is a technology for controlling an electrowetting cell. The electrowetting cell may be controlled by applying a preset first voltage to the electrowetting cell, measuring a first circuit parameter between any one side surface and a conductive liquid disposed in the electrowetting cell and determining whether a reset second voltage is to be applied to the electrowetting cell based on the measured first circuit parameter.

19 Claims, 4 Drawing Sheets

(56) References Cited

U.S. PATENT DOCUMENTS

| | | | |
|---|---|---|---|
| 2010/0177026 A1* | 7/2010 | Van Dijk | G02B 3/14 |
| | | | 345/84 |
| 2011/0204902 A1 | 8/2011 | De Boer et al. | |
| 2013/0201316 A1* | 8/2013 | Binder | H04L 67/12 |
| | | | 348/77 |

OTHER PUBLICATIONS

Frieder Mugele et al., "Electrowetting: From Basics to Applications", Institute of Physics Publishing, Journal of Physics: Condensed Matter, 17, pp. R705-R774, 2005.

* cited by examiner

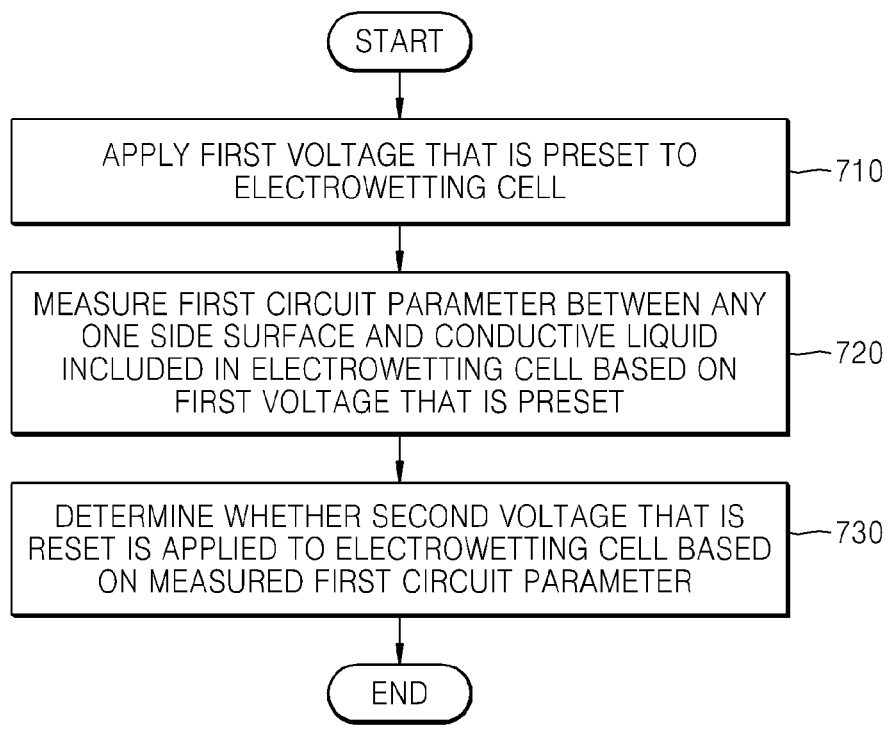

METHOD AND APPARATUS FOR CONTROLLING ELECTROWETTING CELL

RELATED APPLICATION

This application claims the benefit of Korean Patent Application No. 10-2013-0128647, filed on Oct. 28, 2013, in the Korean Intellectual Property Office, the disclosure of which is incorporated herein in its entirety by reference.

BACKGROUND

1. Field

Apparatuses and methods consistent with exemplary embodiments relate to controlling an electrowetting cell, and more particularly, to methods and apparatuses for controlling an electrowetting cell by using a feedback system.

2. Description of the Related Art

In general, electrowetting refers to a phenomenon whereby an interfacial tension is changed due to a voltage applied to a fluid and thus migration or deformation occurs. In other words, the wetting properties of a surface may be changed by application of an electric field.

Electrowetting is applied to a reflective display device in which a voltage is applied to water in a limited space of one pixel including a waterproof insulator, an electrode, an aqueous liquid, and a non-aqueous liquid to change a surface tension of the water and to cause the non-aqueous liquid to migrate. During the operation of the reflective display device using electrowetting, when a positive voltage and a negative voltage are respectively applied to the water and the waterproof insulator, oil having a color migrates and reflected light is changed, thereby adjusting overall colors. Examples of a device using electrowetting may include a liquid lens, a micro pump, a display device, an optical device, and a micro-electromechanical system (MEMS). Recently, an electrowetting display device has been spotlighted as a desired flat panel display device because of its small size, low power consumption, short response time, and high brightness.

SUMMARY

One or more exemplary embodiments may provide methods and apparatuses for controlling a contact angle of an electrowetting cell by using a feedback system.

Additional exemplary aspects and advantages will be set forth in part in the description which follows and, in part, will be apparent from the description, or may be learned by practice of the presented embodiments.

According to an aspect of an exemplary embodiment, an apparatus for controlling an electrowetting cell includes: a voltage application unit that applies a preset first voltage to the electrowetting cell; a measurement unit that measures a first circuit parameter between a conductive liquid included in the electrowetting cell and any one side surface of the electrowetting cell, based on the preset first voltage; and a feedback processing unit that determines whether a reset second voltage is to be applied to the electrowetting cell, based on the measured first circuit parameter.

The first circuit parameter may be one of an impedance, a current, a voltage, and a capacitance between a side surface and the conductive liquid.

The feedback processing unit may compare the measured first circuit parameter with a second circuit parameter that is a predicted parameter determined based on the preset first voltage, and when a difference between the first circuit parameter and the second circuit parameter is equal to or greater than a predetermined value, apply a reset second voltage to the electrowetting cell.

The feedback processing unit may transmit, to the voltage application unit, a control signal for applying the reset second voltage to the electrowetting cell.

The feedback processing unit may include a lookup table that provides information about a second circuit parameter that is a predicted parameter determined based on the preset first voltage.

The measurement unit may include a bridge circuit.

The apparatus may further include a signal amplification unit that amplifies a signal output from the bridge circuit.

The apparatus may further include a noise removing unit that removes noise in a signal output from the bridge circuit.

The voltage application unit may apply any one of a preset direct current (DC) voltage and a preset alternating current (AC) voltage to the electrowetting cell.

According to an aspect of another exemplary embodiment, a method of controlling an electrowetting cell includes: applying a preset first voltage to the electrowetting cell; measuring a first circuit parameter between any one side surface of the electrowetting cell and a conductive liquid disposed in the electrowetting cell, based on the preset first voltage; and determining whether a reset second voltage is to be applied to the electrowetting cell, based on the measured first circuit parameter.

The first circuit parameter may be any one of an impedance, a current, a voltage, and a capacitance between a side surface and the conductive liquid.

The determining may include comparing the measured first circuit parameter with a second circuit parameter that is a predicted parameter determined based on the first voltage, and when a difference between the first circuit parameter and the second circuit parameter is equal to or greater than a predetermined value, applying a reset second voltage to the electrowetting cell.

The determining may include transmitting, to a voltage application unit, a control signal for applying the reset second voltage to the electrowetting cell.

The determining may include determining whether a reset second voltage is to be applied to the electrowetting cell by using a lookup table that provides information about a second circuit parameter that is a predicted parameter based on the preset first voltage.

The measuring may include measuring the first circuit parameter by using a bridge circuit.

The method may further include amplifying a signal that is output from the bridge circuit.

The method may further include removing noise in a signal that is output from the bridge circuit.

The applying may include applying one of a preset direct current (DC) voltage and a preset alternating current (AC) voltage to the electrowetting cell.

BRIEF DESCRIPTION OF THE DRAWINGS

These and/or other exemplary aspects and advantages will become apparent and more readily appreciated from the following description of exemplary embodiments, taken in conjunction with the accompanying drawings in which:

FIG. 7 is a flowchart illustrating a method of controlling an electrowetting cell, according to an exemplary embodiment.

DETAILED DESCRIPTION

Figure 1:
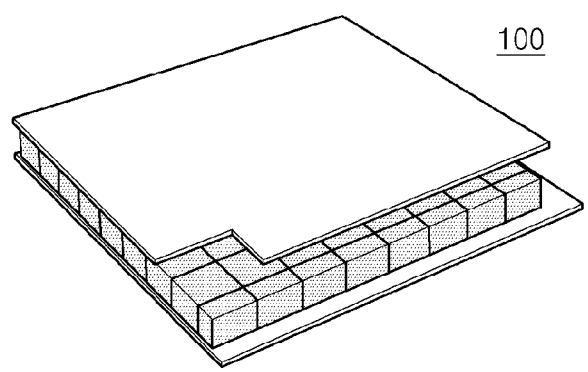
FIG. 1 is a perspective view illustrating an electrowetting device.

As used herein, the term "and/or" includes any and all combinations of one or more of the associated, listed items. Exemplary embodiments will now be described more fully with reference to the accompanying drawings for those of ordinary skill in the art to be able to perform the present invention without any difficulty. The exemplary embodiments described herein may, however, be embodied in many different forms and should not be construed as limiting. Also, parts in the drawings unrelated to the detailed description are omitted to ensure clarity. Like reference numerals in the drawings denote like elements.

Throughout the specification, it will be understood that when an element is referred to as being "connected" to another element, it may be "directly connected" to the other element or "electrically connected" to the other element with intervening elements therebetween. It will be further understood that when a part "includes" or "comprises" an element, unless otherwise defined, the part may further include other elements, not excluding the other elements.

Exemplary embodiments will now be described more fully with reference to the accompanying drawings.

FIG. 1 is a perspective view illustrating an electrowetting device 100.

Referring to FIG. 1, the electrowetting device 100 includes a plurality of electrowetting cells. The electrowetting device 100 of FIG. 1 may be used in a display device such as a liquid crystal display (LCD) in which a lens or prism-type array is formed by adjusting a boundary surface between a liquid and a wall of a cell.

Electrowetting refers to a phenomenon whereby, when a voltage is applied between a conductive liquid and an electrode that contacts the conductive liquid, a contact area and a contact angle between the conductive liquid and the electrode are changed. A display device utilizing electrowetting operates such that a conductive liquid that is formed on a structure to which a non-aqueous coating is applied is brought into contact with an insulating film that is formed on an electrode, and a voltage is applied to the electrode, to change a contact angle between the conductive liquid and the insulating film by using electrical energy.

In the electrowetting device 100, since roughness of a non-aqueous surface on an electrode, characteristics of cells, and characteristics of walls of cells are different, even when the same voltage is applied, a measured contact angle may be different. Also, when a size of each cell is reduced, a volume of a conductive liquid may be reduced, and thus a contact angle may be different from an expected value due to surface energy.

Since the electrowetting device 100 is usually used in a display device including a lens, once a contact angle is not kept constant, its utility may be reduced. Hence, it is necessary to maintain constant a contact angle by continuously correcting the contact angle. According to exemplary embodiments described herein, a difference from a desired contact angle may be minimized by continuously correcting a contact angle that is formed in a cell by using a feedback system.

Figure 2:
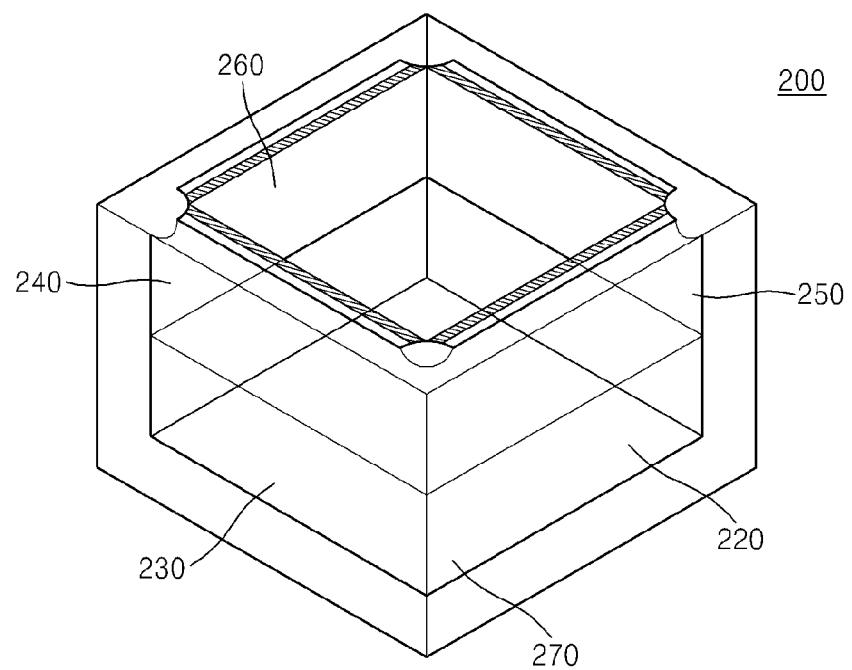
FIG. 2 is a perspective view illustrating an electrowetting cell included in an electrowetting device according to an exemplary embodiment.

FIG. 2 is a perspective view illustrating an electrowetting cell 200 included in an electrowetting device, according to an exemplary embodiment.

The electrowetting cell 200, which is an element for adjusting an angle at which light is emitted according to an electrical signal, may contain a first medium and a second medium having different refractive indices. Either of the first medium and the second medium may be a conductive liquid such as water and the other may be a non-conductive liquid such as oil. Also, either of the first medium and the second medium may be a medium having a color, and the other may be a transparent medium. For example, the first medium may be a non-conductive liquid including a color dye, and the second medium may be a conductive liquid. A boundary surface 210 between the first medium and the second medium may become a refractive surface, and an angle at which light is emitted is changed as a gradient of the boundary surface 210 is changed. The second medium may contact an electrode that is on an upper plate 260 of a first cell, and a contact angle between the second medium and a side electrode of the first cell may be changed.

The electrowetting cell 200 may include four side surfaces, that is, first through fourth side surfaces 220, 230, 240, and 250 that are electrically insulated from one another, an upper plate 260, and a lower plate 270. A cross-sectional shape of a cell region may be a quadrangular shape according to the first through fourth side surfaces 220, 230, 240, and 250. However, the inventive concept is not limited thereto, and a cross-sectional shape of the cell region may be a combination of a circular shape and a polygonal shape.

An apparatus for controlling an electrowetting cell which may change a contact angle between the first medium and the second medium may be mounted on each of the first through fourth side surfaces 220, 230, 240, and 250 of the electrowetting cell 200.

The apparatus may control a contact angle between each side surface of the electrowetting cell 200 and a liquid included in the electrowetting cell 200 based on a preset lookup table. For example, when a voltage of 200V is applied to the first side surface 220 of the electrowetting cell 200, a contact angle may be predicted to be 63°. The apparatus may apply a voltage of 200V to the first side surface 220 of the electrowetting cell 200, and when a difference between an actually measured contact angle and a predicted contact angle is equal to or greater than a predetermined value, the apparatus may reset and apply new voltage.

Even after a voltage that is reset is applied to the first side surface 220 of the electrowetting cell 200, when a difference between an actually measured contact angle and a predicted contact angle is equal to or greater than the predetermined value, a process of resetting the voltage may be repeatedly performed. Since the contact angle is repeatedly measured and the voltage is reset according to a measurement result, a difference between a predicted contact angle and a measured contact angle may be reduced.

The apparatus may be mounted on each of the first through fourth side surfaces 220, 230, 240, and 250 included in the electrowetting cell 200. Also, in a prism array device including a plurality of electrowetting cells, a contact angle at a side surface of each cell may be controlled by mounting the apparatus on each cell.

Figure 3:
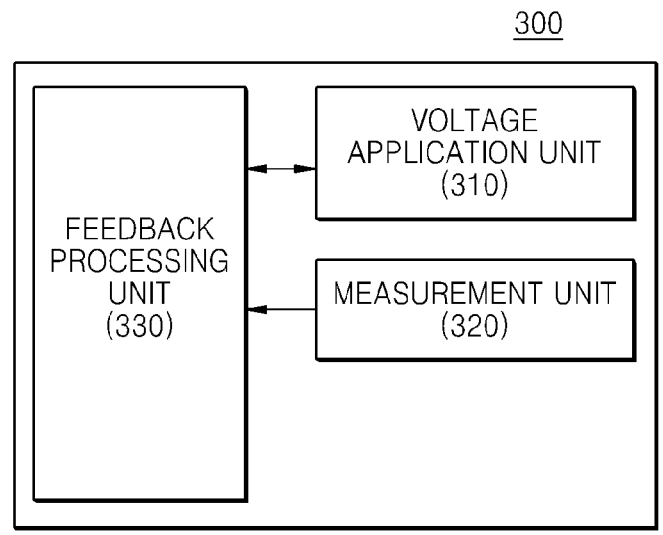
FIG. 3 is a block diagram illustrating an apparatus for controlling an electrowetting cell, according to an exemplary embodiment.

FIG. 3 is a block diagram illustrating an apparatus 300 for controlling an electrowetting cell, according to an exemplary embodiment.

Although the apparatus 300 is shown to include only elements related to the present embodiment in FIG. 3, it will be understood by one of ordinary skill in the art that the apparatus 300 may further include general-purpose elements other than the elements shown in FIG. 3.

Referring to FIG. 3, the apparatus 300 may include a voltage application unit 310, a measurement unit 320, and a feedback processing unit 330, each of which may be embodied by one or more computer processors or other computer circuitry.

The voltage application unit 310 may apply a preset first voltage to the first through fourth side surfaces 220, 230, 240, and 250 and the upper plate 260 of the electrowetting cell 200. The preset first voltage and applied to any one side surface included in the electrowetting cell 200 may be either a direct current (DC) voltage or an alternating current (AC) voltage.

When the voltage application unit 310 applies the first voltage to the first through fourth side surfaces 220, 230, 240, and 250 and the upper plate 260 of the electrowetting cell 200, a contact angle between a conductive liquid included in the electrowetting cell 200 and each side surface of the electrowetting cell 200 may be changed, and thus a contact area may also be changed.

The measurement unit 320 may measure a first circuit parameter between one of the side surfaces included in the electrowetting cell 200 and the conductive liquid included in the electrowetting cell 200, based on the preset first voltage.

Examples of the first circuit parameter may include a current, an impedance, a voltage, and a capacitance which may represent electrical characteristics between the side surface and the conductive liquid. The following will be explained on an example in which the first circuit parameter is a capacitance.

A capacitance may be defined by Equation 1.

$$C = \frac{\varepsilon_y \varepsilon_0 A}{d} \quad (1)$$

where C is a capacitance, d is a thickness of an insulating film and a non-aqueous coating, $\varepsilon_c$, is a vacuum dielectric constant, $\varepsilon_y$ is a relative dielectric constant for a non-aqueous coating material, and A is a contact area between a conductive liquid and the side surface of the electrowetting cell 200.

Once a contact angle between the side surface and the conductive liquid included is changed, a contact area A is also changed. By using this relationship, a contact angle may be derived by measuring a capacitance between the side surface and the conductive liquid.

A method of measuring a capacitance may be a method using a bridge circuit. In a bridge circuit, when a ratio of impedances at four arms is maintained constant and thus a balance is achieved, an output voltage may be 0. Hence, the side surface of the electrowetting cell 200 may be set as one impedance from among impedances at the four arms, and when an output voltage is not 0, it may be determined that an error has occurred in the measured capacitance.

The method of measuring a capacitance by using the bridge circuit will be explained below in detail with reference to FIG. 5.

The feedback processing unit 330 may determine whether a voltage that is reset is applied to the electrowetting cell 200 based on the first circuit parameter that is measured by the measurement unit 320. In detail, the feedback processing unit 330 may compare the measured first circuit parameter with a second circuit parameter that is predicted between one of the outer walls and the conductive liquid based on the first voltage, and when a difference between the first circuit parameter and the second circuit parameter is equal to or greater than a predetermined value, the feedback processing unit 3030 may apply a reset second voltage to the electrowetting cell 200.

The second circuit parameter that is predicted between an outer wall and the conductive liquid based on the first voltage may be extracted from a lookup table included in the apparatus 300.

The lookup table may include a value of the second circuit parameter that is calculated between an outer wall and the conductive liquid based on physical characteristics of a preset voltage. Pieces of information that are included in the lookup table may vary according to the measurement method performed by the measurement unit 320 and the object to be measured.

For example, when a capacitance is measured by using a bridge circuit, the lookup table may include information about three impedances that are preset from among impedances at four bridge-type arms. That is, when the preset first voltage is V1, it may be assumed that impedances that achieve a balance when the voltage V1 is applied may be I1, I2, I3, and I4. Information about the impedances I1, I2, I3, and I4 may be included in the lookup table.

When the first voltage V1 is applied to the bridge circuit including the impedances I1, I2, I3, and I4 and an output voltage is 0, it may be found that an impedance measured at any one side surface of the electrowetting cell 200 is I4. That is, when an output voltage is 0, it may be predicted that a first capacitance that is actually measured has the same value as that of a second capacitance that is predicted.

Also, the feedback processing unit 330 will not reset a voltage when an output voltage is within a predetermined range and may maintain the preset first voltage. That is, the feedback processing unit 330 may calculate an allowable capacitance measurement range based on an allowable contact angle error range in a system using an electrowetting device.

By contrast, when an output voltage is not 0, the feedback processing unit 330 may transmit to the voltage application unit 310 a control signal for applying the reset second voltage to the electrowetting cell 200. The voltage application unit 310 may reset a voltage that is applied to the electrowetting cell 200 based on the received control signal.

When an output voltage is equal to or greater than a predetermined value, the feedback processing unit 330 may include in the control signal information that the output voltage is equal to or greater than the predetermined value. The voltage application unit 310 may extract from the received control signal the information that the output voltage is equal to or greater than the predetermined value, and may change units in which a size of the voltage applied to the electrowetting cell 200 is adjusted.

In detail, when the voltage output from the bridge circuit is equal to or greater than the predetermined value, it may be determined that an error of a measured contact angle of the electrowetting cell 200 is high. In this case, it may be necessary to increase a value of the voltage that is adjusted, compared to a case in which an error is small, in order to reduce the error in the contact angle. For example, assuming the voltage application unit 310 usually adjusts the value of the voltage that is reset in units of 5V, when an output voltage is equal to or greater than a predetermined value, the voltage application unit 310 may adjust the value the a voltage that is reset in units of 10V.

Figure 4:
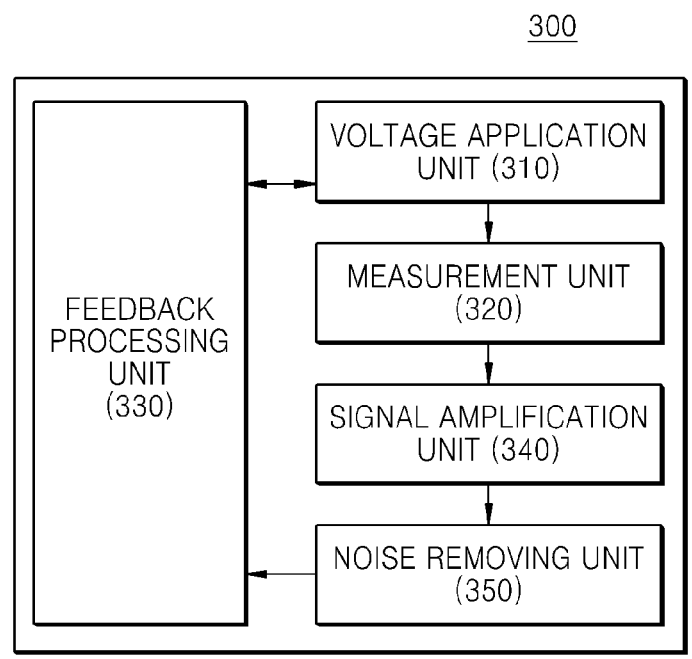
FIG. 4 is a block diagram illustrating the apparatus according to another exemplary embodiment.

FIG. 4 is a block diagram illustrating the apparatus 300 according to another exemplary embodiment.

Although the apparatus 300 is shown to include only elements related to the present embodiment in FIG. 4, it will be understood by one of ordinary skill in the art that the apparatus 300 may further include general-purpose elements other than the elements shown in FIG. 4.

Referring to FIG. 4, the apparatus 300 may include the voltage application unit 310, the measurement unit 320, the feedback processing unit 330, a signal amplification unit 340, and a noise removing unit 350, each of which may be embodied by one or more computer processors or other computer circuitry.

The voltage application unit 310 may apply a preset first voltage to the first through fourth side surfaces 220, 230, 240, and 250 and to the upper plate 260 of the electrowetting cell 200. The preset first voltage and applied to a side surface of the electrowetting cell 200 may be a DC voltage or an AC voltage.

The measurement unit 320 may measure a first circuit parameter between one side surface of the electrowetting cell 200 and a conductive liquid disposed in the electrowetting cell 200 based on the preset first voltage. The following will be explained on the assumption that the first circuit parameter is a capacitance.

When a contact angle between the side surface and the conductive liquid is changed, a contact area A is changed. By using this relationship, a contact angle may be derived by measuring a capacitance between the side surface and the conductive liquid.

The signal amplification unit 340 may be used in order to increase the precision of the capacitance measured by the measurement unit 320. When the measurement unit 320 uses a bridge circuit, the signal amplification unit 340 may amplify a voltage that is output from the bridge circuit.

The noise removing unit 350 may also be used in order to increase the precision of the capacitance measured by the measurement unit 320. The noise removing unit 350 may be directly connected to the measurement unit 320, separately from the signal amplification unit 340, and may be used in order to remove noise which is generated in the first circuit parameter, for example, the capacitance, measured by the measurement unit 320.

The noise removing unit 350 may receive a signal amplified by the signal amplification unit 340 and may increase the precision of the first circuit parameter measured by the measurement unit 320 by removing noise.

The feedback processing unit 330 may determine whether a voltage that is reset is applied to the electrowetting cell 200 based on the first circuit parameter that is output through the signal amplification unit 340 and the noise removing unit 350. In detail, the feedback processing unit 330 may compare the measured first circuit parameter with a second circuit parameter that is predicted between the outer wall and the conductive liquid based on the first voltage, and may apply a reset second voltage to the electrowetting cell 200 when a difference between the first circuit parameter and the second circuit parameter is equal to or greater than a predetermined value.

Figure 5:
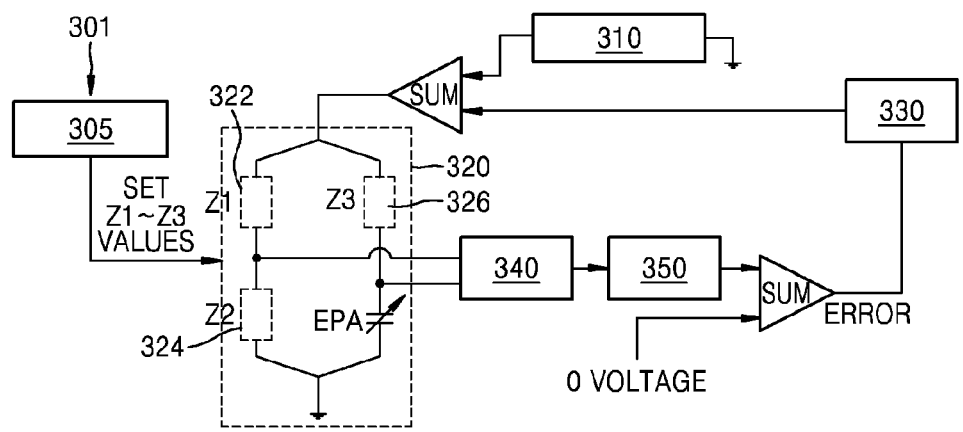
FIG. 5 is a diagram for explaining a method of controlling the electrowetting cell that measures a first circuit parameter by using a bridge circuit, according to an exemplary embodiment.

FIG. 5 is a diagram for explaining a method of controlling the electrowetting cell 200 that measures a first circuit parameter by using a bridge circuit, according to an exemplary embodiment.

A target contact angle of the electrowetting cell 200 may be set in advance. A user may input information 301 about the set target contact angle. The feedback processing unit 330 may detect a value corresponding to the target contact angle in a lookup table that is stored in a memory 305. Since the bridge circuit is used in order to control the electrowetting cell 200 in FIG. 5, information about impedances 322, 324, and 326 included in the bridge circuit may also be included in the lookup table.

For example, assume that the target contact angle set by the user is 120°. When the user inputs information about the target contact angle to the apparatus 300, the feedback processing unit 330 may calculate a capacitance corresponding to a contact angle of 120° from the lookup table that is stored in the memory 305. Also, the feedback processing unit 330 may determine a first voltage that is applied to the voltage application unit 310 for the bridge circuit to achieve a balance based on the impedances 322, 324, and 326 bridge circuit.

When the voltage application unit 310 applies the first voltage to the electrowetting cell 200, the voltage output from the bridge circuit included in the measurement unit 320 might not be 0. In this case, the signal amplification unit 340 may amplify the output voltage. Also, the noise removing unit 350 may obtain a more accurate measurement value by removing noise included in the amplified output voltage.

The voltage measured by the measurement unit 320 may be transmitted to the feedback processing unit 330. When the output voltage is equal to or greater than a preset value, the feedback processing unit 330 may transmit a control signal to the voltage application unit 310 and may apply a reset second voltage to the electrowetting cell 200.

The feedback processing unit 330 may correct a contact angle by applying a proportionalizer to a value obtained by adding the voltage output from the measurement value 320 and the preset first voltage. Alternatively, the feedback processing unit 330 may correct a contact angle by using a proportionalizer and a differentiator, or may correct a contact angle by using a proportionalizer and an integrator. Alternatively, the feedback processing unit 330 may correct a contact angle by using all of a proportionalizer, a differentiator, and an integrator.

Figure 6:
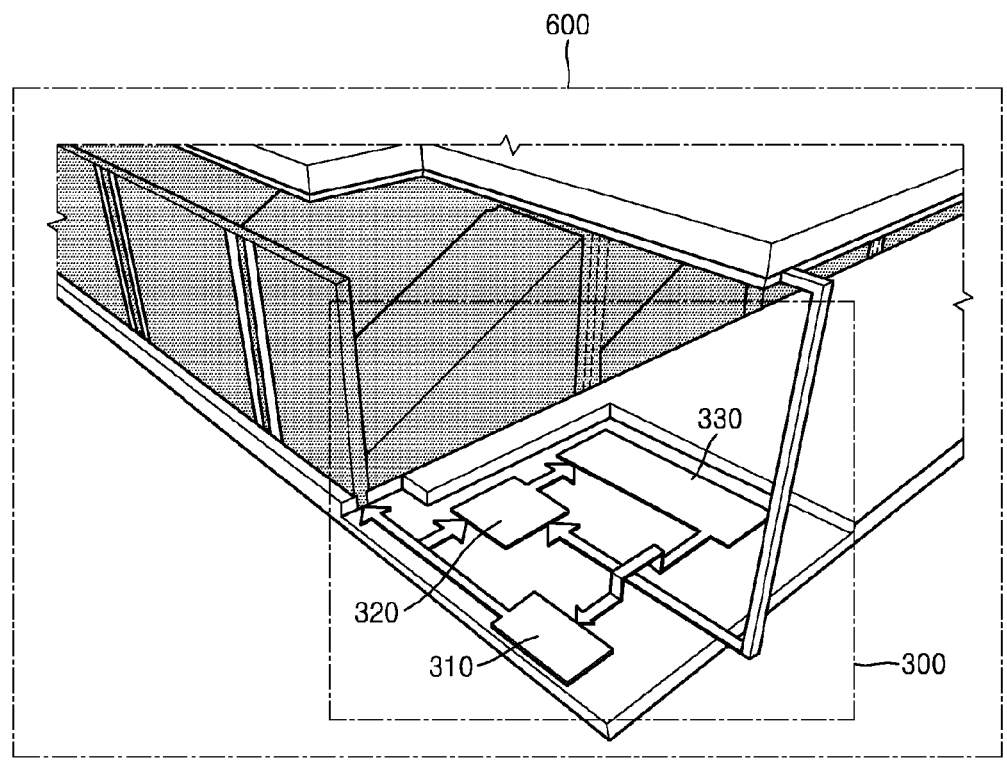
FIG. 6 is a view for explaining an example where the apparatus is mounted on an electrowetting prism array, according to an exemplary embodiment.

FIG. 6 is a view for explaining an example in which the apparatus 300 is mounted on an electrowetting prism array 600, according to an exemplary embodiment n.

The electrowetting device in FIG. 6 is the electrowetting prism array 600. The electrowetting prism array 600 includes a plurality of electrowetting cells, and the electrowetting cells are arranged in a two-dimensional (2D) manner in the electrowetting prism array 600.

The apparatus 300 may be mounted on each of the electrowetting cells included in the electrowetting prism array 600. Also, the apparatus 300 may be mounted on side surface of each of the electrowetting cells.

Even when the electrowetting cells are commonly included in the electrowetting prism array 600, the electrowetting cells may have different characteristics due to a manufacturing process and characteristics of contact surfaces. Hence, the apparatus 300 may be mounted on each side surface of each of the electrowetting cells.

FIG. 7 is a flowchart for explaining a method of controlling an electrowetting cell, according to an exemplary embodiment.

In operation 710, the apparatus 300 may apply a preset first voltage to the electrowetting cell 200. The preset first voltage applied to a side surface of the electrowetting cell 200 may be a DC voltage or an AC voltage.

In operation 720, the apparatus 300 may measure a first circuit parameter between the side surface and a conductive liquid disposed in the electrowetting cell 200 based on the preset first voltage.

Examples of the first circuit parameter may include a current, an impedance, a voltage, and a capacitance which may represent electrical characteristics between the side surface and the conductive liquid.

In operation 730, the apparatus 300 may determine whether a reset second voltage is applied to the electrowetting cell 200 based on the measured first circuit parameter.

In detail, the feedback processing unit 330 may compare the measured first circuit parameter with a second circuit parameter that is predicted between any the side surface and the conductive liquid based on the first voltage, and when a difference between the first circuit parameter and the second circuit parameter is equal to or greater than a predetermined value, may apply a reset second voltage to the electrowetting cell 200.

The second circuit parameter that is predicted between the side surface and the conductive liquid based on the first voltage may be extracted from a lookup table that is included in the apparatus 300.

The lookup table may include a value of the second circuit parameter that is calculated between the side surface and the conductive liquid based on physical characteristics of a preset voltage. Pieces of information included in the lookup table may vary according to a measurement method performed by the measurement unit 320 and an object to be measured.

The device described herein may include a processor, a memory for storing and executing program data, a permanent storage such as a disk drive, a communication port for handling communications with external devices, and user interface devices, etc. Any processes may be implemented as software modules or algorithms, and may be stored as program instructions or computer-readable codes executable by a processor on a computer-readable media such as magnetic storage media (e.g., read only memories (ROMs), floppy discs, or hard discs), optically readable media (e.g., compact disk-read only memories (CD-ROMs), or digital versatile disks (DVDs)), etc. The computer-readable recording medium may also be distributed over network coupled computer systems so that the computer-readable code is stored and executed in a distributed fashion. The computer-readable recording medium may be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding, reference has been made to the exemplary embodiments illustrated in the drawings, and specific language has been used to describe these embodiments. However, no limitation is intended by this specific language, and all descriptions should be construed to encompass all embodiments that would normally occur to one of ordinary skill in the art.

Exemplary embodiments may be described in terms of functional block components and various processing steps. Such functional blocks may be realized by any number of hardware and/or software components configured to perform the specified functions. For example, exemplary embodiments may employ various integrated circuit components, e.g., memory elements, processing elements, logic elements, look-up tables, and the like, which may carry out a variety of functions under the control of one or more microprocessors or other control devices. Similarly, where the elements of exemplary embodiments are implemented using software programming or software elements, the embodiments may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, exemplary embodiments could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples and are not intended to be otherwise limiting in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no described item or component is essential unless the element is specifically described as "essential" or "critical".

The use of the terms "a" and "an" and "the" and similar referents in the context of describing the exemplary embodiments (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely for clarity and does not pose any limitation unless otherwise claimed. It will be understood by one of ordinary skill in the art that numerous modifications, adaptations, and changes will be made according to design conditions and factors without departing from the spirit and scope of the appended claims.

What is claimed is:

1. An apparatus for controlling an electrowetting cell, the apparatus comprising:
   a voltage application unit configured to apply a preset first voltage to the electrowetting cell;
   a measurement unit configured to measure a first circuit parameter between a conductive liquid in the electrowetting cell and any one side surface of the electrowetting cell; and a processor configured to predict a second circuit parameter based on the preset first voltage and to determine whether to apply a reset second voltage to the electrowetting cell, based on a difference between the measured first circuit parameter and the predicted second circuit parameter.

2. The apparatus of claim 1, wherein the first circuit parameter is one of an impedance, a current, a voltage, and a capacitance between the side surface of the electrowetting cell and the conductive liquid.

3. The apparatus of claim 1, wherein the processor is further configured to compare the measured first circuit parameter with a second circuit parameter, and when a difference between the first circuit parameter and the second circuit parameter is equal to or greater than a predetermined value, apply the reset second voltage to the side surface of the electrowetting cell.

4. The apparatus of claim 3, wherein the processor is further configured to transmit, to the voltage application unit, a control signal for applying the reset second voltage to the side surface of the electrowetting cell.

5. The apparatus of claim 1, wherein the processor comprises a lookup table including information about the second circuit parameter which is a predicted parameter determined based on the preset first voltage.

6. The apparatus of claim 1, wherein the measurement unit comprises a bridge circuit.

7. The apparatus of claim 6, further comprising a signal amplification unit configured to amplify a signal output from the bridge circuit.

8. The apparatus of claim 6, further comprising a noise removing unit configured to remove noise in a signal output from the bridge circuit.

9. The apparatus of claim 1, wherein the voltage application unit is further configured to apply one of a direct current voltage and an alternating current voltage to the side surface of the electrowetting cell.

10. A method of controlling an electrowetting cell, the method comprising:
applying a preset first voltage to the electrowetting cell;
measuring a first circuit parameter between any one side surface of the electrowetting cell and a conductive liquid disposed in the electrowetting cell;
predicting a second circuit parameter based on the preset first voltage; and
determining whether a reset second voltage is to be applied to the electrowetting cell, based on a difference between the measured first circuit parameter and the predicted second circuit parameter.

11. The method of claim 10, wherein the first circuit parameter is one of an impedance, a current, a voltage, and a capacitance between the side surface of the electrowetting cell and the conductive liquid.

12. The method of claim 10, wherein the determining comprises comparing the measured first circuit parameter with a second circuit parameter; and wherein the method further comprises:
applying a reset second voltage to the side surface of the electrowetting cell when a difference between the first circuit parameter and the second circuit parameter is equal to or greater than a predetermined value.

13. The method of claim 12, wherein the applying the reset second voltage comprises transmitting, to a voltage application unit, a control signal for applying the reset second voltage.

14. The method of claim 10, wherein the determining comprises using a lookup table comprising information about the second circuit parameter which is a predicted parameter determined based on the first preset voltage.

15. The method of claim 10, wherein the measuring comprises measuring the first circuit parameter by using a bridge circuit.

16. The method of claim 15, further comprising amplifying a signal that is output from the bridge circuit.

17. The method of claim 15, further comprising removing noise in a signal that is output from the bridge circuit.

18. The method of claim 10, wherein the applying comprises applying one of a direct current voltage and an alternating current voltage to the electrowetting cell.

19. A non-transitory computer-readable recording medium having embodied thereon a program executing a method of controlling an electrowetting cell, the method comprising:
applying a reset first voltage to the electrowetting cell;
measuring a first circuit parameter between any one side surface of the electrowetting cell and a conductive liquid disposed in the electrowetting cell;
predicting a second circuit parameter based on the preset first voltage; and
determining whether a reset second voltage is to be applied to the electrowetting cell based on a difference between the measured first circuit parameter and the predicted second circuit parameter.

* * * * *